UNITED STATES PATENT OFFICE 2,289,974

PLANT HORMONE COMPOSITION

Rowland W. Leiby, Ithaca, N. Y., assignor to Atlas Powder Company, Wilmington, Del., a corporation of Delaware No Drawing. Application September 11, 1940, Serial No. 356,353

10 Claims. (Cl. 47—58)

The present invention relates to improvements in a plant hormone composition.

An object of the invention is to provide a spray composition containing a plant hormone which has greatly improved efficiency for use in treating plants.

A further object is to provide a spray composition comprising a plant hormone and a water dispersible partial lauric acid ester of an inner ether derivable from a hexitol.

A still further object is to provide a spray composition comprising naphthalene acetic acid and a water-dispersible partial lauric acid ester of an inner ether derivable from a hexitol.

A particular object of the invention is to provide a spray composition useful in retarding dropping of fruit from apple trees.

Recently there have appeared a number of so-called plant hormones which have been found useful for a variety of purposes in plant propagation and cultivation. For example, certain of these compounds have been found to have specific effects in improving the lasting qualities of leafy and flowering plants. A very important development of this work has been the discovery that certain plant hormones are capable of retarding the dropping of fruit from trees for substantial periods beyond their normal time. In the case of the apple this fact is of especial value since certain varieties of apple such as McIntosh, Wealthy and Dutchess can be made much more attractive and marketable if they can be kept on the trees long enough to develop good color. These and other varieties difficult to obtain in good color are frequently found to be only partly colored due to lack of sufficient exposure to sunlight. Where the poorly colored apples are kept on the trees for an additional week or two beyond the time at which they ordinarily drop off there is a more complete development of color.

Furthermore, the use of a hormone to retain fruit on trees for a longer time permits larger quantities of the fruit to be hand picked and so uninjured as it would be if allowed to drop from the trees.

Many plant hormones have been discovered and are described in contemporary scientific literature. The present invention is applicable to any of these hormones in connection with which there is a problem in contacting the plant with the material. Since the invention resides in providing a composition particularly for use in spraying onto the plants it will not be employed with hormones that are used in dry or undiluted form.

Among the known hormones are indole compounds like indoleacetic acid and indole butyric acid; naphthalene compounds like naphthalene acetic acid and naphthalene acetamide; phenyl compounds like phenylacetic acid and many others. In retarding the dropping of apples from their trees the naphthalene compounds have been found to possess especial merit. (See article by Gardner, Marth and Batjer, Science 90, 208–9 (1939).)

The invention will be described with particular reference to treating apple trees to retard dropping of the fruit but it is to be understood that it applies equally to other uses of plant hormones in water solutions or dispersions.

In treating apple trees with a hormone, for example, naphthalene acetic acid, the hormone is usually dissolved first in a solvent like ethanol and then diluted with a large quantity of water to the desired concentration. This solution is then sprayed upon the fruit and branches of the trees. The effect of the hormone is local and depends on contact of the substance with the particular tissue of the plant that holds the fruit on the twig. Such of the solution as is deposited on the fruit itself, or on leaves or the trunk of the tree is ineffective. Likewise, the effectiveness of the application depends on how completely the hormone contacts the tissue at the juncture of the twig and the stem of the fruit for this is the point at which the break occurs that allows the fruit to drop from the tree.

The present invention consists in adding to the hormone solution a novel composition which increases the effectiveness of the hormone to a marked degree. The effect is probably due to improved penetration and spreading power in the composition of this invention.

The material which is added to the hormone solution is a water-dispersible composition comprising partial lauric acid ester of an inner ether derivable from a hexitol, as for example, the technical (as distinguished from pure crystalline compounds) monolaurates, dilaurates and trilaurates of mannitan and sorbitan and the technical monolaurates of mannide and sorbide. By "water-dispersible composition comprising partial lauric acid ester of an inner ether" is meant a composition comprising a substantial proportion of at least one such ester and in addition other reacted and/or unreacted material, generally hydroxylic and/or acidic in character, and comprising at least a portion of the by-products of the reaction of hexitol or inner ethers derivable therefrom with fatty oil or fatty acid, such other material being present in the composition in sufficient complexity and amount to render the composition water-dispersible. The pure crystalline single esters will frequently be found ineffective, an important reason for which being that they may neither emulsify with, nor dissolve in, water. However, in the presence of other materials such as the by-products obtained by the esterification of hexitol with commercial lauric acid, they form water-dispersible compositions having excellent emulsifying properties. It is to be understood that I also contemplate the use of the technical reaction products from which fractions of these by-products have been removed so long as the technical product retains a sufficient complexity of ingredients as to render it water-dispersible. Conversely, the water-dispersible compositions may be synthesized by the addition to the relatively pure esters of suitable auxiliary materials such as the by-products referred to above to form a composition which is readily water dispersible.

A water dispersible composition which contains mannitan monolaurate can be prepared, for example, by reacting mannitol with lauric acid, in the presence of an alkaline catalyst such as NaOH or $Na_2CO_3$, at about 200–300° C. or under other conditions in which a molecule of water is split off the mannitol to form its inner ether mannitan. The product of this reaction comprises a large portion of mannitan monolaurate and may also comprise some higher esters of mannitan, unreacted mannitan and mannide mono- and di-esters. Under similar conditions mannitol can be reacted in a mol for mol ratio with the mixed fatty acids (predominantly lauric acid) derived from coconut oil.

Preferable to the composition of esters or of the mixed esters just mentioned is the product of an alcoholysis reaction between the hexitol and coconut oil under conditions in which the hexitol loses water and forms an inner ether and the ether becomes partially esterified with fatty acid (predominantly lauric) split away from the glycerol with which it is combined in the oil. This product comprises a large amount of the partial lauric acid esters of an inner ether derivable from a hexitol, varying amounts of partial esters of other fatty acids and inner ether derivable from a hexitol, and partial fatty acid esters of glycerol. The products of this type are preferable because they have, in general, somewhat better wetting and spreading characteristics than the other type described above and are readily available and economical to prepare.

Such an alcoholysis product can be prepared, for example, by reacting 2 mols mannitol with 1 mol coconut oil in the presence of an alkaline catalyst and at about 200–300° C. The use of two mols mannitol to one mol oil is for the purpose of forming the monoesters when two fatty acid molecules are freed by splitting the triglyceride. The alkaline catalyst, for instance, NaOH or $Na_2CO_3$, assists in forming the inner ether mannitan from the mannitol under the conditions of the reaction. The product comprises a large portion of mannitan monolaurate, mannitan mono-esters of other fatty acids derivable from coconut oil, partial (largely mono-) fatty acid glycerides, and in addition to those may comprise small amounts of higher mannitan esters, unesterified mannitan, and some mannide mono- and di-esters. For convenience this derivative will be referred to hereinafter as "mannitan coconut oil derivative.

While the partial lauric acid esters of all of the inner ethers derivable from the hexitols are useful in this invention, the monolauric acid ester of mannitan is preferred, especially in the presence of related substances such as those formed in the above-described alcoholysis reaction.

The invention is not to be taken as limited to any particular manner of preparing the material to be used. Various ways of preparing partial lauric acid esters of inner ethers derivable from hexitols will be apparent to those skilled in this art. The inner ethers derivable from the hexitols and forming the esterification product with the acid may be employed directly in the reaction, although, as pointed out above, the inner ether may be formed under the conditions of and during the esterification reaction by utilizing the polyhydric alcohol as the initial material. While mannitol and sorbitol derivatives are preferable because of their availability, the derivatives of the other isomeric hexitols are also within the scope of invention.

In accordance with my invention a plant hormone such as naphthalene acetic acid is made up to a suitable concentration, e. g., 4 grams to 100 gallons of water, and a water dispersible partial lauric acid ester of the type described added in proportion of say 0.1% or less. The resulting composition is applied to the plant or tree preferably by spraying.

The following specific example is given to illustrate the invention. It should be understood that this is merely illustrative of the invention and not limiting.

A solution of 4 grams naphthalene acetic acid was dissolved in alcohol and added to 100 gallons water containing mannitan-coconut oil as 1 part in 1600. This solution was sprayed onto small apple trees of the Early McIntosh variety when the fruit was nearly ripe. One gallon of spray was applied to each tree. The spray wet the fruit and stems uniformly and evenly with a thin film. It was noted that the solution spread completely around the stems of the fruit even though the spray was directed against only one side.

For comparison with the above solution, other trees of the same variety were sprayed (one gallon per tree) with an aqueous spray made up with 1 pint per 100 gallons of a commercial product containing naphthalene acetic acid (4 grams in 1 pint alcohol) and a liquid spreader of unknown character. The spray was noted to stand in beads on the fruit and stems instead of spreading evenly. Contact of the hormone with the stems was not as good as the contact in the test conducted with the composition of the invention.

A further group of trees of the same variety was left unsprayed and used to check the results of the above two sprayings.

The tests were conducted in a commercial manner and the apples were picked as they became red enough for harvesting. In each spraying test the trees were treated twice, a six-day interval elapsing between the sprayings.

The following table sets out the results of the two spraying tests and the check:

| Spray | Number of apples | | Per cent hand picked |
| --- | --- | --- | --- |
| | Hand picked | Dropped | |
| Naphthalene acetic acid plus mannitan-coconut oil | 485 | 58 | *Per cent* 89 |
| Commercial naphthalene acetic acid composition containing unknown spreader | 187 | 56 | 77 |
| Unsprayed check | 191 | 107 | 64 |

The above test showed an improvement of 25% in the number of apples hand picked after spraying with naphthalene acetic acid and mannitan-coconut oil as compared to only 13% improvement when similar trees were sprayed in the same manner with a commercial form of naphthalene acetic acid.

The commercial product used in the comparative test contained a spreader, since a water solution of the hormone naphthalene acetic acid cannot be applied without a spreader of some sort to assist in wetting the plant. The comparison therefore emphasizes the advantage gained by using mannitan-coconut oil or another of the products described herein in the hormone spray composition.

The invention is not limited to the specific example given nor to any particular proportions. Concentrations of both hormone substance and laurate ester for use in obtaining a particular result will naturally be the lowest ones capable of producing the desired result for reasons of economy.

The invention is to be limited only by the scope of the following claims.

I claim:

1. A composition comprising a plant hormone and a water-dispersible composition comprising partial lauric acid ester of an inner ether of a hexitol.

2. A composition for use in retarding the dropping of fruit from a fruit tree comprising naphthalene acetic acid and a water-dispersible composition comprising partial lauric acid ester of an inner ether of a hexitol.

3. A composition comprising a plant hormone; and a water-dispersible composition comprising the reaction product of a polyhydroxy material selected from the group consisting of hexitols and inner ethers thereof, and material selected from the class consisting of coconut oil and coconut oil fatty acids, said product comprising a substantial amount of partial lauric acid ester of inner ether of a hexitol.

4. A composition as in claim 3 wherein the said plant hormone is naphthalene acetic acid.

5. A composition comprising a plant hormone; and a water-dispersible composition comprising the reaction product of a polyhydroxy material selected from the class consisting of mannitol and inner ethers thereof, and material selected from the group consisting of coconut oil and coconut oil fatty acids, said product comprising a substantial amount of mannitan monolaurate.

6. A composition for use as an aqueous spray for application to an apple tree to retard dropping of apples therefrom comprising a plant hormone capable of retarding dropping of apples; and a water-dispersible composition comprising the reaction product of a polyhydroxy material selected from the class consisting of mannitol and inner ethers thereof, and material selected from the group consisting of coconut oil and coconut oil fatty acids, said product comprising a substantial amount of mannitan monolaurate.

7. A composition as in claim 6 wherein the said plant hormone is naphthalene acetic acid.

8. The method for retarding the dropping of apples from apple trees which comprises applying to the stems of the fruit and the twigs of the trees, as the fruit approaches ripeness, an aqueous composition containing a plant hormone capable of retarding the dropping of the fruit; and a water-dispersible composition comprising the reaction product of a polyhydroxy material selected from the class consisting of hexitols and inner ethers thereof, and material selected from the group consisting of coconut oil and coconut oil fatty acids, said product comprising a substantial amount of partial lauric acid ester of inner ether of a hexitol.

9. The method for retarding the dropping of apples from apple trees which comprises spraying the trees, as the fruit approaches ripeness, with an aqueous composition containing a plant hormone capable of retarding the dropping of the fruit; and a water-dispersible composition comprising the reaction product of a polyhydroxy material selected from the class consisting of mannitol and inner ethers thereof, and material selected from the group consisting of coconut oil and coconut oil fatty acids, said product comprising a substantial amount of mannitan monolaurate.

10. A method as in claim 9 wherein the said plant hormone is naphthalene acetic acid.

ROWLAND W. LEIBY.